United States Patent
Zhang et al.

(10) Patent No.: US 10,609,141 B2
(45) Date of Patent: Mar. 31, 2020

(54) METHODS AND APPARATUSES FOR CLUSTER SWITCHING

(71) Applicant: ALIBABA GROUP HOLDING LIMITED, George Town, Grand Cayman (KY)

(72) Inventors: Ting Zhang, Hangzhou (CN); Zhongyu Zou, Hangzhou (CN); Wenzhao Li, Hangzhou (CN); Ming Yang, Hangzhou (CN); Jinbo Wu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/870,572

(22) Filed: Jan. 12, 2018

(65) Prior Publication Data
US 2018/0139280 A1 May 17, 2018

Related U.S. Application Data

(63) Continuation of application No. PCT/CN2016/088300, filed on Jul. 4, 2016.

(30) Foreign Application Priority Data

Jul. 13, 2015 (CN) .......................... 2015 1 0408179

(51) Int. Cl.
G06F 12/00 (2006.01)
G06F 13/00 (2006.01)
(Continued)

(52) U.S. Cl.
CPC .......... *H04L 67/1095* (2013.01); *G06F 3/065* (2013.01); *G06F 3/067* (2013.01);
(Continued)

(58) Field of Classification Search
CPC . H04L 67/1095; G06F 16/178; G06F 3/0619; G06F 3/065; G06F 3/0647
See application file for complete search history.

(56) References Cited

U.S. PATENT DOCUMENTS 9,170,928 B1 * 10/2015 Dantkale ............. G06F 12/0223
2009/0313503 A1 * 12/2009 Atluri ................. G06F 11/1453
714/19
(Continued)

FOREIGN PATENT DOCUMENTS

CN 1756108 A 4/2006
CN 101227315 A 7/2008
(Continued)

OTHER PUBLICATIONS

SIPO First Chinese Search Report issued in Chinese Application No. 201510408179.9, dated Jan. 23, 2019, 1 page.
(Continued)

*Primary Examiner* — Sean D Rossiter
(74) *Attorney, Agent, or Firm* — Finnegan, Henderson, Farabow, Garrett & Dunner LLP

(57) ABSTRACT

Apparatuses and methods are disclosed for cluster switching. An exemplary method may include synchronizing original data on a first cluster to a second cluster after starting to switch clusters. A priority of the original data on the second cluster is set to a lower priority. The method may also include responding to a write operation request on the second cluster in the period of synchronizing the original data on the first cluster to the second cluster. A priority of new data corresponding to the write operation request is set to a higher priority. A version of data with a higher priority can overwrite another version of data. The method may further include responding to the write operation request on
(Continued)

the second cluster after synchronizing the original data on the first cluster to the second cluster.

21 Claims, 10 Drawing Sheets

(51) Int. Cl.
    *H04L 29/08*     (2006.01)
    *G06F 16/178*     (2019.01)
    *G06F 3/06*     (2006.01)

(52) U.S. Cl.
    CPC .......... *G06F 3/0619* (2013.01); *G06F 16/178* (2019.01); *H04L 67/125* (2013.01); *G06F 3/0647* (2013.01)

(56) References Cited

U.S. PATENT DOCUMENTS

| | | | |
|---|---|---|---|
| 2010/0075592 A1 | 3/2010 | Kim et al. | |
| 2013/0326159 A1* | 12/2013 | Vijayan | G06F 3/0644 711/148 |
| 2014/0181579 A1* | 6/2014 | Whitehead | G06F 11/1451 714/15 |
| 2014/0214772 A1 | 7/2014 | Kadayam | |
| 2018/0260125 A1* | 9/2018 | Botes | G06F 3/0617 |

FOREIGN PATENT DOCUMENTS

| | | |
|---|---|---|
| CN | 101237585 A | 8/2008 |
| CN | 101557320 A | 10/2009 |
| CN | 104461774 A | 3/2015 |
| WO | WO 2013/153259 A1 | 10/2013 |
| WO | WO 2017/008648 A1 | 1/2017 |

OTHER PUBLICATIONS

SIPO First Office Action issued in Chinese Application No. 201510408179.9, dated Feb. 1, 2019, 17 pages.

SIPO Second Office Action issued in Chinese Application No. 201510408179.9, dated Jul. 2, 2019, 18 pages.

PCT International Preliminary Report on Patentability issued in International Application No. PCT/CN2016/088300, dated Jan. 16, 2018, 7 pages.

PCT International Search Report and Written Opinion dated Sep. 28, 2016, issued in corresponding International Application No. PCT/CN2016/088300 (14 pages).

* cited by examiner

METHODS AND APPARATUSES FOR CLUSTER SWITCHING

CROSS REFERENCE TO RELATED APPLICATION

This application claims priority to International Application No. PCT/CN2016/088300, filed on Jul. 4, 2016, which claims the benefits of priority to Chinese Application No. 201510408179.9, filed Jul. 13, 2015, both of which are incorporated herein by reference in their entireties.

TECHNICAL FIELD

The present application relates to computers, and more particularly, to cluster switching methods and apparatuses in a cloud storage system.

BACKGROUND

In a cloud storage system, data is stored in a single cluster. To improve data storage security and provide a cluster-level disaster recovery solution, or to implement data migration between clusters, data usually needs to be backed up to another cluster. Such a process is referred to as inter-cluster data synchronization. When a cluster to which a user accesses for reading or writing needs to be changed from a primary cluster to a secondary cluster, such change process is referred to as switching a primary cluster. How to ensure synchronization consistency of data between clusters and ensure that there is no impact on the user during cluster switching are key technical solutions for synchronization and switching between clusters.

Nowadays, technical solutions for synchronization are generally classified into an inter-cluster asynchronous synchronization solution and synchronous synchronization solution. They separately work in combination with different switching solutions:

First, in the asynchronous synchronization solution, an asynchronous module is used to copy data from a primary cluster to a secondary cluster. This solution may ensure data consistency but has a certain degree of latency. When switching needs to be performed on a primary cluster providing external services, some data on the primary cluster may not yet be synchronized to a secondary cluster. Consequently, this data is invisible to the user and there is transient data loss after switching and before the data is completely synchronized. In addition, during synchronization of the data, if the user overwrites the data, a data inconsistency problem may occur. Therefore, writing data into a primary cluster is stopped first when cluster switching is required. After all the data on the primary cluster is synchronized to a secondary cluster, the switching of the cluster is done. Then the user's write access is opened up. In this way, user access is not affected, and the data inconsistency problem can be solved. However, because of the latency, user usage is affected as the user is forbidden to write data into the cluster before switching.

Second, in the synchronous synchronization solution, a user writes data into a primary cluster and a secondary cluster separately, and cluster switching is simple. When the data is successfully written into both the primary cluster and the secondary cluster, a successful message is returned to the user. However, this will reduce the user's access successful rate and prolong user access delays. In addition, it is difficult to solve the data inconsistency problem caused when writing a piece of data between the primary cluster and the secondary cluster fails, and a problem that data existing in the primary cluster cannot be copied.

SUMMARY

The present disclosure is directed to a method and a device for cluster switching to solve the problems of user usage being affected and not being able to ensure data consistency during switching between clusters for inter-cluster data migration or backup.

In some aspects, the present disclosure is directed to a method for cluster switching. The method may include synchronizing original data to be synchronized on a first cluster to a second cluster after starting to switch from the first cluster to the second cluster. A priority of the original data on the second cluster is set to a lower priority. The method may also include responding to a write operation request on the second cluster in the period of synchronizing the original data on the first cluster to the second cluster. A priority of new data corresponding to the write operation request is set to a higher priority. A version of data with a higher priority is allowed to overwrite another version of data with a lower priority on the second cluster. The method may further include responding to the write operation request on the second cluster after synchronizing the original data on the first cluster to the second cluster.

In the period of synchronizing the original data on the first cluster to the second cluster, the method may further include responding to a read operation request on the first cluster and the second cluster. After synchronizing the original data on the first cluster to the second cluster, the method may further include responding to the read operation request on the second cluster. The write operation request includes an add, rewrite, or delete operation request for data.

When the write operation request is an add or rewrite operation request for data, and when responding to the write operation request on the second cluster in the period of synchronizing the original data to be synchronized on the first cluster to the second cluster, the method may further include writing the add or rewrite operation request into a message queue. The method may also include reading the add or rewrite operation request from the message queue. In addition, the method may include deleting the read write operation request from the message queue after synchronizing added or rewritten data, corresponding to the read add or rewrite operation request, on the second cluster to the first cluster.

Deleting the read write operation request from the message queue after synchronizing added or rewritten data, corresponding to the read add or rewrite operation request, on the second cluster to the first cluster includes: determining whether added or rewritten data corresponding to the read add or rewrite operation request exist on the second cluster. If it exists, synchronizing the added or rewritten data to the first cluster, and deleting the read add or rewrite operation request from the message queue. If it does not exist, deleting the read add or rewrite operation request from the message queue.

Alternatively, when the write operation request is a delete operation request for data, and when responding to the write operation request on the second cluster in the period of synchronizing the original data on the first cluster to the second cluster, the method may further include writing the delete operation request into a message queue. The method may also include reading the delete operation request from the message queue. In addition, the method may include deleting the read delete operation request from the message queue after rendering corresponding data on the first cluster and the second cluster consistent with each other in accordance with the read delete operation request.

In some embodiments, deleting the read delete operation request from the message queue after rendering corresponding data on the first cluster and the second cluster consistent with each other in accordance with the read delete operation request may include: if data to be deleted corresponding to the read delete operation request does not exist on either the first cluster or the second cluster, deleting the read delete operation request from the message queue; if data to be deleted corresponding to the read delete operation request does not exist on the second cluster but exists on the first cluster, deleting the read delete operation request from the message queue after deleting the corresponding data to be deleted on the first cluster; if data to be deleted corresponding to the read delete operation request does not exist on the first cluster but exists on the second cluster, deleting the read delete operation request from the message queue after synchronizing the corresponding data to be deleted on the second cluster to the first cluster; or if data to be deleted corresponding to the read delete operation request exists on both the first cluster and the second cluster, deleting the read delete operation request from the message queue.

Responding to the read operation request on the first cluster and the second cluster in the period of synchronizing the original data on the first cluster to the second cluster may include: determining whether data corresponding to the read operation request is read from the first cluster and the second cluster; returning the data if the corresponding data is read from the first cluster or the second cluster; and returning the corresponding data read from the second cluster if the corresponding data is read from both the first cluster and the second cluster.

In some aspects, the present disclosure is directed to a device for cluster switching. The device may include a synchronization apparatus configured to synchronize original data to be synchronized on a first cluster to a second cluster after starting to switch from the first cluster to the second cluster. A priority of the original data on the second cluster is set to a lower priority. The device may also include a synchronization-period write responding apparatus configured to respond to a write operation request on the second cluster in the period of synchronizing the original data on the first cluster to the second cluster. A priority of new data corresponding to the write operation request is set to a higher priority. A version of data with a higher priority is allowed to overwrite another version of data with a lower priority on the second cluster. The device may further include a post-synchronization write responding apparatus configured to respond to the write operation request on the second cluster after synchronizing the original data on the first cluster to the second cluster.

In addition, the device may include a synchronization-period read responding apparatus configured to respond to a read operation request on the first cluster and the second cluster in the period of synchronizing the original data on the first cluster to the second cluster. Moreover, the device may include a post-synchronization read responding apparatus configured to respond to the read operation request on the second cluster after synchronizing the original data on the first cluster to the second cluster. The write operation request includes an add, rewrite, or delete operation request for data.

The device may further include an add-rewrite request message-queue apparatus configured to: when the write operation request is an add or rewrite operation request for data, and when responding to the write operation request on the second cluster in the period of synchronizing the original data on the first cluster to the second cluster, write the add or rewrite operation request into a message queue; read the add or rewrite operation request from the message queue; and delete the read write operation request from the message queue after synchronizing added or rewritten data, corresponding to the read add or rewrite operation request, on the second cluster to the first cluster.

In some embodiments, the add-rewrite request message-queue apparatus may be configured to: determine whether added or rewritten data corresponding to the read add or rewrite operation request exist on the second cluster; if it exists, synchronize the added or rewritten data to the first cluster, and delete the read add or rewrite operation request from the message queue; and if it does not exist, delete the read add or rewrite operation request from the message queue.

The device may also include a delete request message-queue apparatus configured to: when the write operation request is a delete operation request for data, and when responding to the write operation request on the second cluster in the period of synchronizing the original data on the first cluster to the second cluster, write the delete operation request into a message queue; read the delete operation request from the message queue; and delete the read delete operation request from the message queue after rendering corresponding data on the first cluster and the second cluster consistent with each other in accordance with the read delete operation request.

The delete request message-queue apparatus is configured to: if data to be deleted corresponding to the read delete operation request does not exist on either the first cluster or the second cluster, delete the read delete operation request from the message queue; if data to be deleted corresponding to the read delete operation request does not exist on the second cluster but exists on the first cluster, delete the read delete operation request from the message queue after deleting the corresponding data to be deleted on the first cluster; if data to be deleted corresponding to the read delete operation request does not exist on the first cluster but exists on the second cluster, delete the read delete operation request from the message queue after synchronizing the corresponding data to be deleted on the second cluster to the first cluster; or if data to be deleted corresponding to the read delete operation request exists on both the first cluster and the second cluster, delete the read delete operation request from the message queue.

The synchronization-period read responding apparatus may be configured to: determine whether data corresponding to the read operation request is read from the first cluster and the second cluster; return the data if the corresponding data is read from the first cluster or the second cluster; and return the corresponding data read from the second cluster if the corresponding data is read from both the first cluster and the second cluster.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

The same or similar reference numbers in these drawings represent the same or similar components.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

In a configuration of the present application, a terminal, a device of a service network, and a trusted party each include one or more processors (e.g., central processing units (CPUs)), an input/output interface, a network interface, and a memory.

The memory may include a non-persistent memory, a random access memory (RAM) and/or non-volatile memory or the like in a computer readable medium, for example, a read-only memory (ROM) or a flash memory (flash RAM). The memory is an example of the computer-readable medium.

The computer-readable medium includes persistent and non-persistent media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static RAM (SRAM), a dynamic RAM (DRAM), other types of RAMs, a ROM, an electrically erasable programmable ROM (EEPROM), a flash memory or other memory technologies, a compact disk ROM (CD-ROM), a digital versatile disc (DVD) or other optical storages, a cassette tape, a magnetic tape/magnetic disk storage or other magnetic storage devices, or any other non-transmission medium, and can be used to store information that accessible by the computing device. According to the definition of this disclosure, the computer readable medium does not include transitory computer readable media (transitory media), such as a modulated data signal and a carrier.

Figure 1:
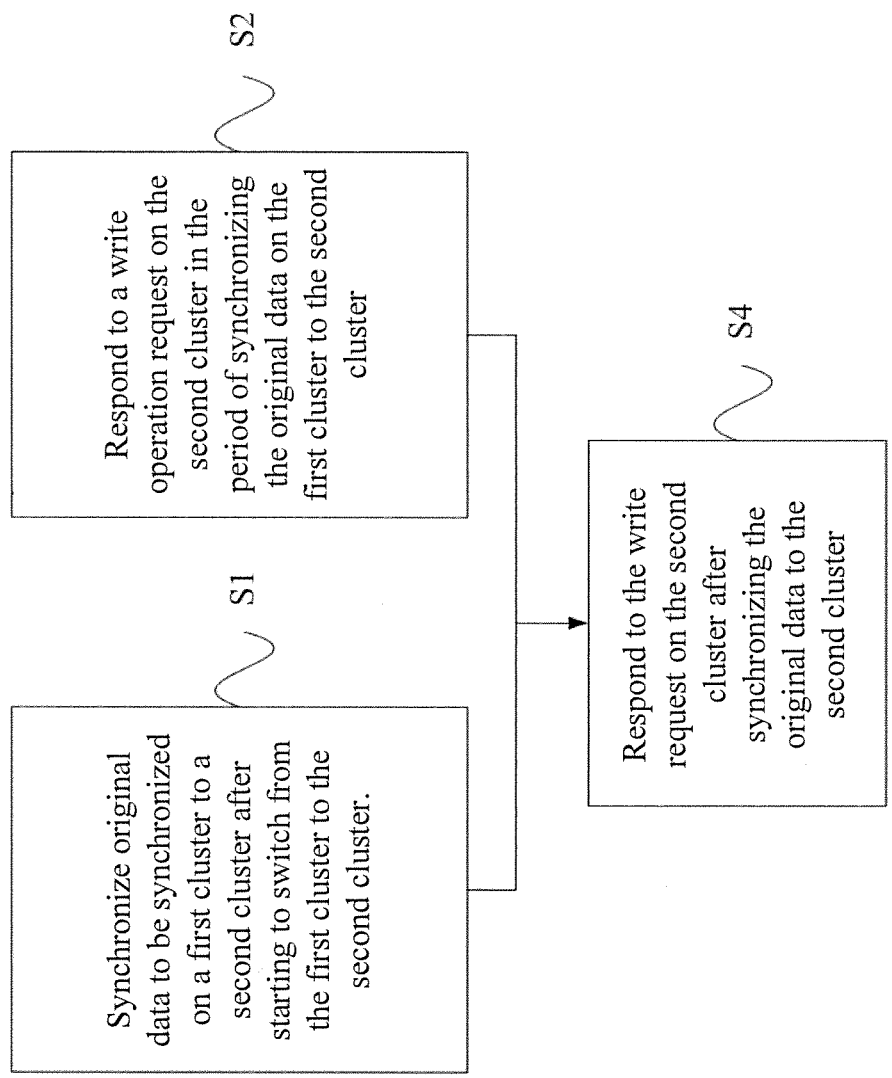
FIG. 1 is a flow chart of an exemplary method for cluster switching, according to some embodiments of the present application.

FIG. 1 is a flow chart of an exemplary method for cluster switching, according to some embodiments of the present application. As shown in FIG. 1, the present application is directed to a method for cluster switching, including the following step:

Step S1: Synchronize original data to be synchronized on a first cluster to a second cluster after starting to switch from the first cluster to the second cluster. A priority of the original data on the second cluster is set to a lower priority.

For example, synchronization from a first cluster A to a second cluster B starts before switching from the first cluster A to the second cluster B. When the synchronization from the first cluster A to the second cluster B is completed, switching from the first cluster A to the second cluster B is also completed. Synchronization from the first cluster A to the second cluster B refers to backing up original data on the first cluster A to the primary cluster B. The second cluster B can provide data read/write services for a user after switching from the first cluster A to the second cluster B is completed.

In addition, because the synchronization from the first cluster A to the second cluster B starts before cluster switching, the original data synchronized from the first cluster A on the second cluster B includes: original data synchronized from the first cluster A on the second cluster B before the cluster switching starts, and original data from the first cluster A on the second cluster B in the period from beginning to end of cluster switching. For example, there are originally 5000 pieces of original data on the first cluster A, and the original data synchronized from the first cluster A on the second cluster B includes 2000 of the 5000 pieces of original data on the second cluster B that are already synchronized from the first cluster A before the cluster switching starts. Then, the original data synchronized from the first cluster A on the second cluster B further includes the 3000 pieces of original data that need from the first cluster A to the second cluster B in the period from beginning to end of cluster switching.

Before the cluster switching starts, or in a period from beginning to end of cluster switching, a priority of the original data synchronized from the first cluster A on the second cluster B is set to a lower priority, e.g., a level of 0. The data is distinguished from new data corresponding to a write operation request and with a priority subsequently set to be high, e.g., a level of 1.

Step S2: Respond to a write operation request on the second cluster in the period of synchronizing the original data to be synchronized on the first cluster to the second cluster. A priority of new data corresponding to the write operation request is set to a higher priority, and a version of data with a higher priority is allowed to overwrite another version of data with a lower priority on the second cluster Step S1 and step S2 may be performed at the same time. After the cluster switching starts, two types of data exist on the second cluster B. One type is new data, and the other type is the original data synchronized from the first cluster A. To prevent the new data from being overwritten with the original data synchronized from the first cluster A, and to ensure that the new data, e.g., level-1 data, can overwrite the original data (i.e., lower priority data, such as level-0 data) synchronized from the first cluster A or updated new data (same-level data, such as level-1 data).

A version of data with a higher priority is allowed to overwrite another version of data with a lower or same priority on the second cluster B. For example, there is original data a=100 on the second cluster B that is synchronized from the first cluster. Subsequently, a user initiates a write operation request and the request corresponds to new data a=200. Because the data a=100 has a lower priority, e.g., a level of 0, and the data a=200 has a higher priority, e.g., a level of 1, a version of data with the higher priority overwrites a version of data with the lower priority, and a value of data a on the second cluster B is correspondingly updated to 200. If another user subsequently initiates an updated write operation request and the request corresponds to new data a=300, a version of data with the higher priority overwrites a previous version of data with a same priority, and a value of data a on the second cluster is correspondingly updated to 300.

As another example, a user initiates a write operation request on the second cluster B and the request corresponds to new data a=200. Subsequently, there is original data a=100 synchronized from the first cluster A. Because the data a=100 has a lower priority, e.g., a level of 0, and the data a=200 has a higher priority, e.g., a level of 1, a version of data with the lower priority cannot overwrite a version of data with the higher priority, and the value of the data a on the second cluster is still 200 correspondingly.

Step S4: Respond to the write operation request on the second cluster after synchronizing the original data to be synchronized on the first cluster to the second cluster.

Step S4 can be performed after step S1 and step S2. After the cluster synchronization ends, all original data on the first cluster A has been synchronized to the second cluster B. The data write operation request only needs to be responded to on the second cluster B, and the priority of the data on the second cluster B no longer needs to be distinguished. Switching can be performed on a primary cluster providing external services without affecting user usage. That is, without the need to prohibit user access, the user can read or write all data from beginning to end of switching, and consistency of data on both the first cluster and the second cluster can be ensured, thereby implementing seamless inter-cluster data migration or backup.

Figure 2:
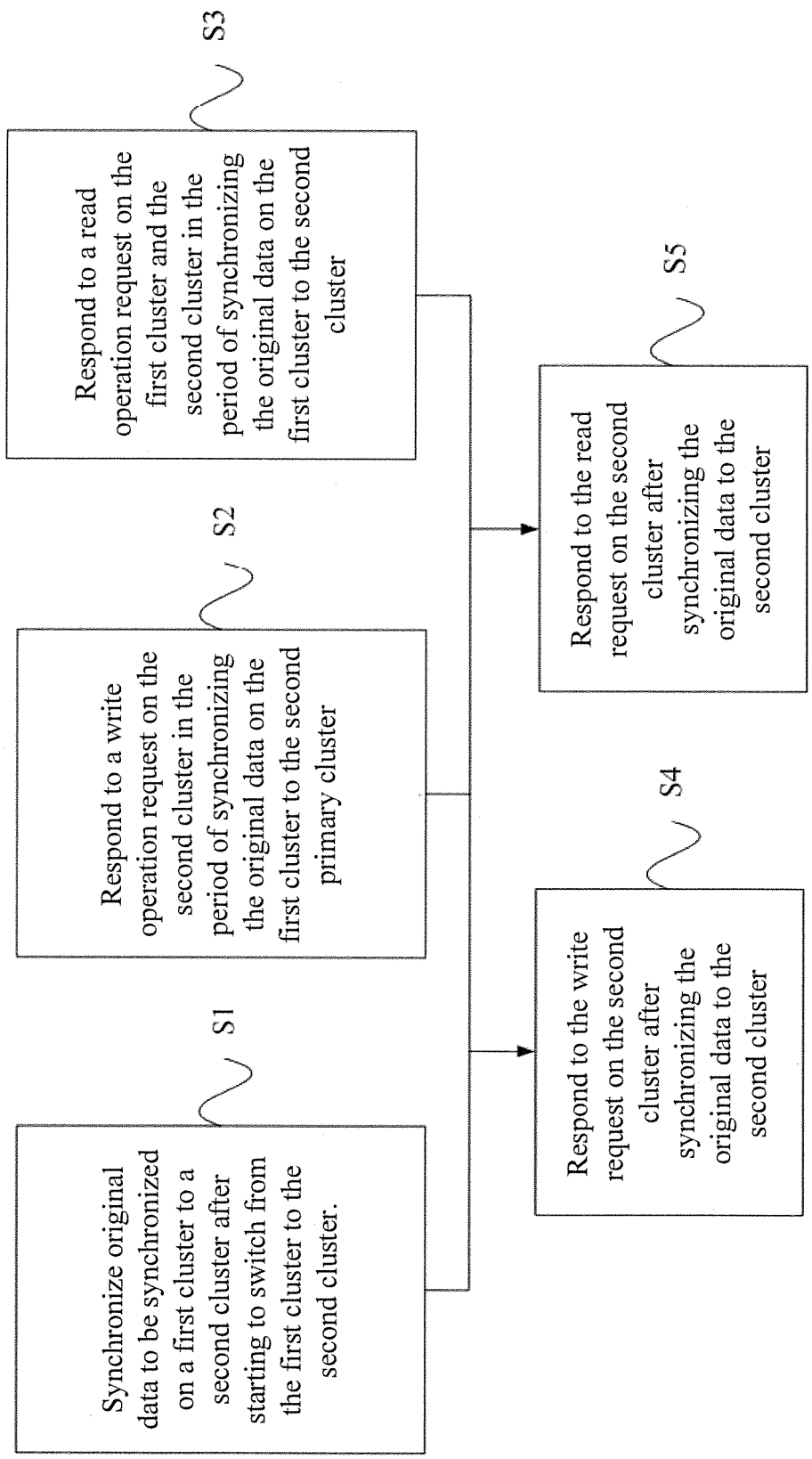
FIG. 2 is a flow chart of an exemplary method for cluster switching, according to some embodiments of the present application.

FIG. 2 is a flow chart of an exemplary method for cluster switching, according to some embodiments of the present application. As shown in FIG. 2, when step S1 is performed, step S3 is also performed as follows:

Step S3: Respond to a read operation request on the first cluster and the second cluster in the period of synchronizing the original data to be synchronized on the first cluster to the second cluster.

After step S3 is performed, and when step S4 is performed, step S5 can be performed as follows:

Step S5: Respond to the read operation request on the second cluster after synchronizing the original data to be synchronized on the first cluster to the second cluster.

Before the cluster synchronization ends, a data read operation request in the period of synchronization from the first cluster A to the second cluster B needs to be responded to on the first cluster and the second cluster. Before the cluster synchronization ends, some original data may not have yet been synchronized to the second cluster. In other words, requested original data may still be found on the first cluster even though it is not found on the second cluster B. Therefore, the data read operation request in the period of synchronization from the first cluster A to the second cluster B needs to be responded to on both the first cluster and the second cluster.

After the cluster synchronization ends, all original data on the first cluster has been synchronized to the second cluster, the data read operation request only needs to be responded to on the second cluster. Thus, a data request by the user can be met both before and after the cluster switching ends.

In some embodiments, the write operation request can include an add, rewrite, or delete operation request for data. After starting to switch from a first cluster to a second cluster, according to a write operation request of the user, new data that the second cluster does not have is added thereto, or an existing data version is modified, or existing data is deleted to meet various write operation requests of the user.

It is appreciated that the description of the foregoing write operation requests are merely examples. Other existing description or description possibly appearing in the future of a write operation request, if applicable to the present application, should also fall within the protection scope of the present application.

Figure 3:
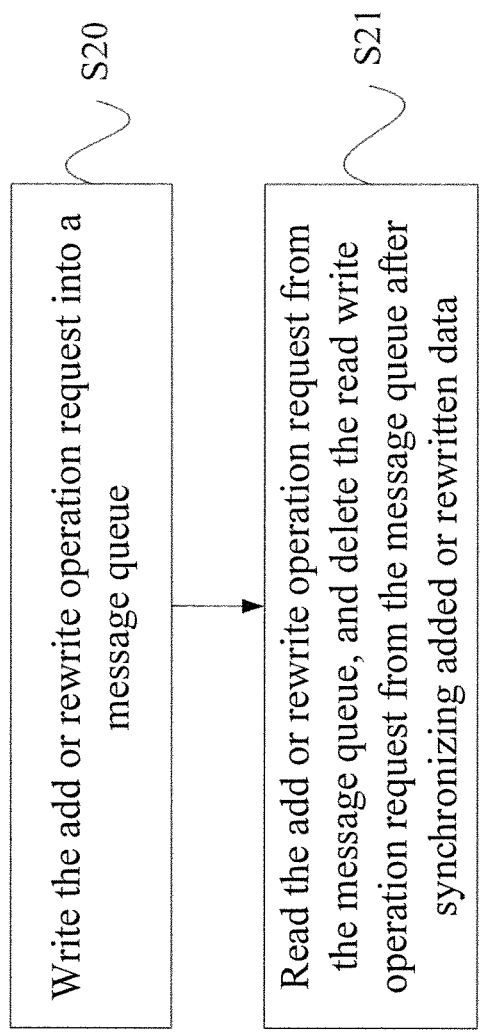
FIG. 3 is a flow chart of an exemplary method for cluster switching, according to some embodiments of the present application.

FIG. 3 is a flow chart of an exemplary method for cluster switching, according to some embodiments of the present application. As shown in FIG. 3, when the write operation request is an add or rewrite operation request for data, step S2 is performed. When responding to the write operation request on the second cluster in the period of synchronizing the original data to be synchronized on the first cluster to the second cluster, the method further includes the following steps:

Step S20: Write the add or rewrite operation request into a message queue.

Step S21: Read the add or rewrite operation request from the message queue, and delete the read write operation request from the message queue after synchronizing added or rewritten data, corresponding to the read add or rewrite operation request, on the second cluster B to the first cluster A.

The write operation request in the message queue is used to mark data to be added or rewritten on the second cluster B that is to be synchronized to the first cluster A. Each time a piece of data to be added or rewritten on the second cluster B is completely synchronized to the first cluster A, a corresponding write operation request is deleted. In this way, consistency of data on both the first cluster and the second cluster can be ensured. Synchronization of data on the two clusters can always be maintained, that can meet another new demand for switching from the second cluster B back to the first cluster A.

It is appreciated that the description of the foregoing message queue is merely an example, and other existing description or description possibly appearing in the future of a message queue, if applicable to the present application, should also fall within the protection scope of the present application.

Figure 4:
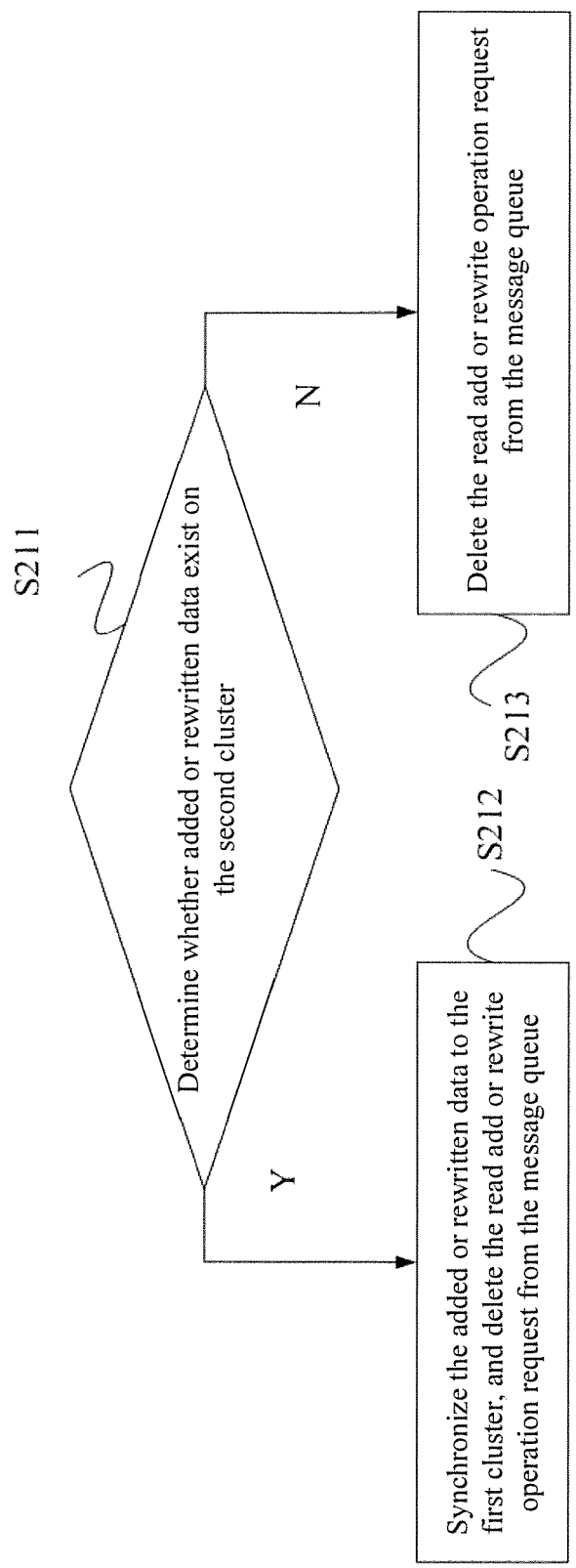
FIG. 4 is a flow chart of an exemplary method for cluster switching, according to some embodiments of the present application.

FIG. 4 is a flow chart of an exemplary method for cluster switching, according to some embodiments of the present application. As shown in FIG. 4, deleting the read write operation request from the message queue after synchronizing added or rewritten data, corresponding to the read add or rewrite operation request, on the second cluster to the first cluster of step S21 may include:

Step S211: Determine whether added or rewritten data corresponding to the read add or rewrite operation request exist on the second cluster. If yes, go to step S212. If not, go to step S213.

Step S212: Synchronize the added or rewritten data to the first cluster, and delete the read add or rewrite operation request from the message queue. If data synchronization fails, data synchronization may repeatedly be tried until the data to be added or rewritten on the second cluster B is successfully synchronized to the first cluster A.

Step S213: Delete the read add or rewrite operation request from the message queue. When writing data to be added or rewritten into the second cluster B fails, although a corresponding add or rewrite operation request is recorded in the message queue, data not existing on the second cluster B does not need to be synchronized to the first cluster A. Instead, the read add or rewrite operation request may be directly deleted from the message queue. In such a way, consistency of data on both the first cluster and the second cluster can be ensured.

Those skilled in the art should understand that the description of whether a read add/rewrite operation request exists on a second cluster is merely an example, and other existing description or description possibly appearing in the future of whether a read add/rewrite operation request exists on a second cluster, if applicable to the present application, should also fall within the protection scope of the present application.

Figure 5:
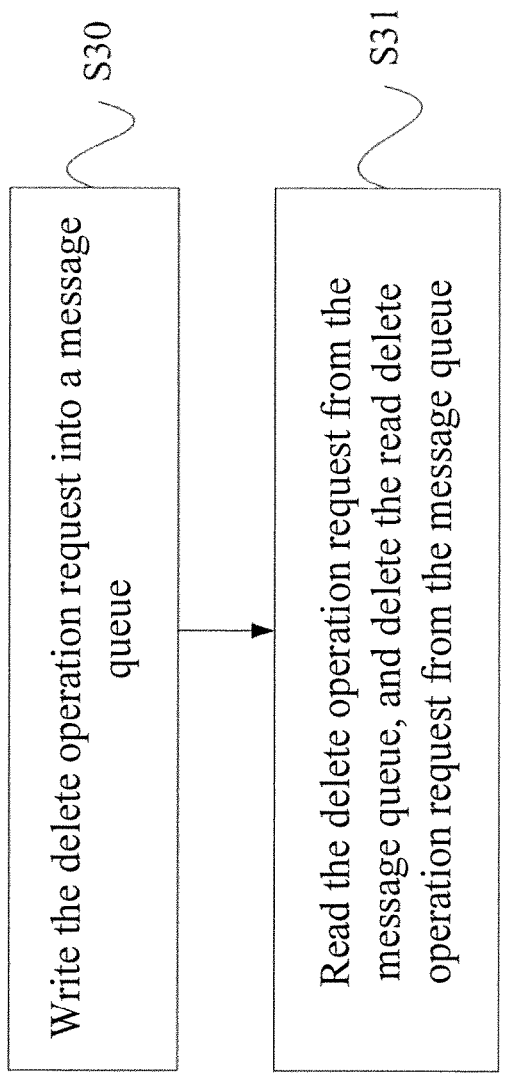
FIG. 5 is a flow chart of an exemplary method for cluster switching, according to some embodiments of the present application.

FIG. 5 is a flow chart of an exemplary method for cluster switching, according to some embodiments of the present application. As shown in FIG. 5, when the write operation request is a delete operation request for data, step S2 is performed. When responding to the write operation request on the second cluster in the period of synchronizing the original data to be synchronized on the first cluster to the second cluster, the method can further include the following steps:

Step S30: Write the delete operation request into a message queue.

Step S31: Read the delete operation request from the message queue; and delete the read delete operation request from the message queue after rendering corresponding data on the first cluster and the second cluster consistent with each other in accordance with the read delete operation request.

A write operation request in the message queue is used to mark data to be deleted on the second cluster B that is to be rendered consistent with the corresponding data on the first cluster A. Each time a piece of data to be deleted on the second cluster B is rendered consistent with the data on the first cluster A, a corresponding write operation request is deleted. In this way, consistency of data on both the first cluster and the second cluster can be ensured. Synchronization of data on the two clusters may always be maintained to meet a new request for switching from the second cluster B back to the first cluster A.

It is appreciated that the description of the foregoing message queue is merely an example, and other existing description or description possibly appearing in the future of a message queue, if applicable to the present application, should also fall within the protection scope of the present application.

After rendering corresponding data on the first cluster and the second cluster consistent with each other in accordance with the read delete operation request, deleting the read delete operation request from the message queue in step 31 may include the following operations.

If data to be deleted corresponding to the read delete operation request does not exist on either the first cluster or the second cluster, delete the read delete operation request from the message queue. In such case, the corresponding data on the first cluster and the second cluster has been rendered consistent with each other. The read delete operation request can be directly deleted from the message queue.

If data to be deleted corresponding to the read delete operation request does not exist on the second cluster but exists on the first cluster, delete the read delete operation request from the message queue after deleting the corresponding data to be deleted on the first cluster. Because the corresponding data on the second cluster is already deleted, the corresponding data to be deleted on the first cluster should be deleted. Then the read delete operation request is deleted from the message queue. The corresponding data on the first cluster and the second cluster can be rendered consistent with each other.

If data to be deleted corresponding to the read delete operation request does not exist on the first cluster but exists on the second cluster, delete the read delete operation request from the message queue after synchronizing the corresponding data to be deleted on the second cluster to the first cluster. Because data on the second cluster B that should be deleted is not deleted, to render data on the first cluster A always consistent with that on the second cluster B, the corresponding delete operation request may be deleted from the message queue after the data that should be deleted but is not yet deleted on the second cluster B is synchronized to the first cluster A.

If data to be deleted corresponding to the read delete operation request exists on both the first cluster and the second cluster, delete the read delete operation request from the message queue. Because the corresponding data on the first cluster and the second cluster is already rendered consistent with each other, the read delete operation request can be directly deleted from the message queue.

It is appreciated that the foregoing description that the corresponding data on the first cluster and the second cluster is rendered consistent with each other are merely examples. Other existing description or possibly appearing description in the future that corresponding data on a first cluster and a second cluster is rendered consistent with each other, if applicable to the present application, should also fall within the protection scope of the present application.

Figure 6:
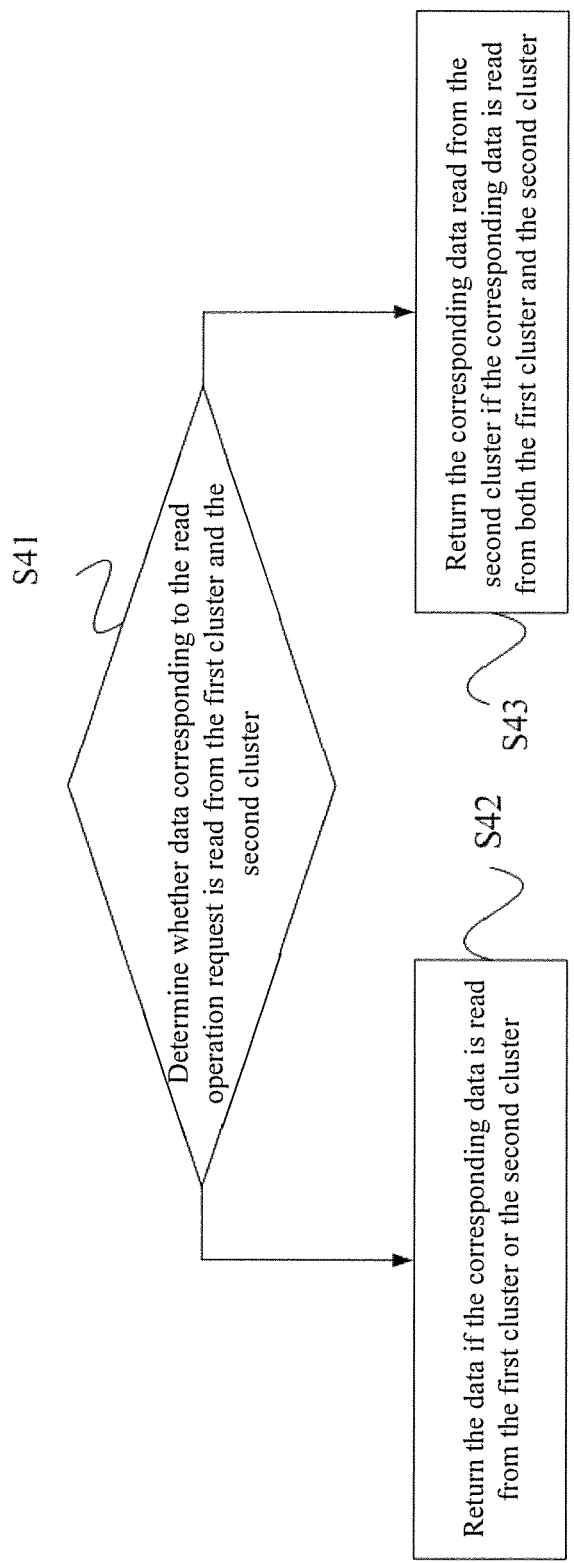
FIG. 6 is a flow chart of an exemplary method for cluster switching, according to some embodiments of the present application.

FIG. 6 is a flow chart of an exemplary method for cluster switching, according to some embodiments of the present application. As shown in FIG. 6, in the period of synchronizing the original data to be synchronized on the first cluster to the second cluster, responding to the read operation request on the first cluster and the second cluster in step S3 may include:

Step S41: Determine whether data corresponding to the read operation request is read from the first cluster and the second cluster.

Step S42: Return the data if the corresponding data is read from the first cluster or the second cluster. For example, if the corresponding data is read from one of the first cluster and the second cluster, the read data may be directly returned to meet a read request of the user.

Step S43: Return the corresponding data read from the second cluster if the corresponding data is read from both the first cluster and the second cluster. For example, if the corresponding data is read from both the first cluster and the second cluster, data on the second cluster B either has a version consistent with data on the first cluster A, or has a version newer than data on the first cluster A. In other words, an updated version of corresponding data with a higher priority after replacement, the corresponding data read from the second cluster can be returned to the user. In addition, if the corresponding data is read from neither the first cluster nor the second cluster, information indicating a read failure may be returned to the user.

Figure 7:
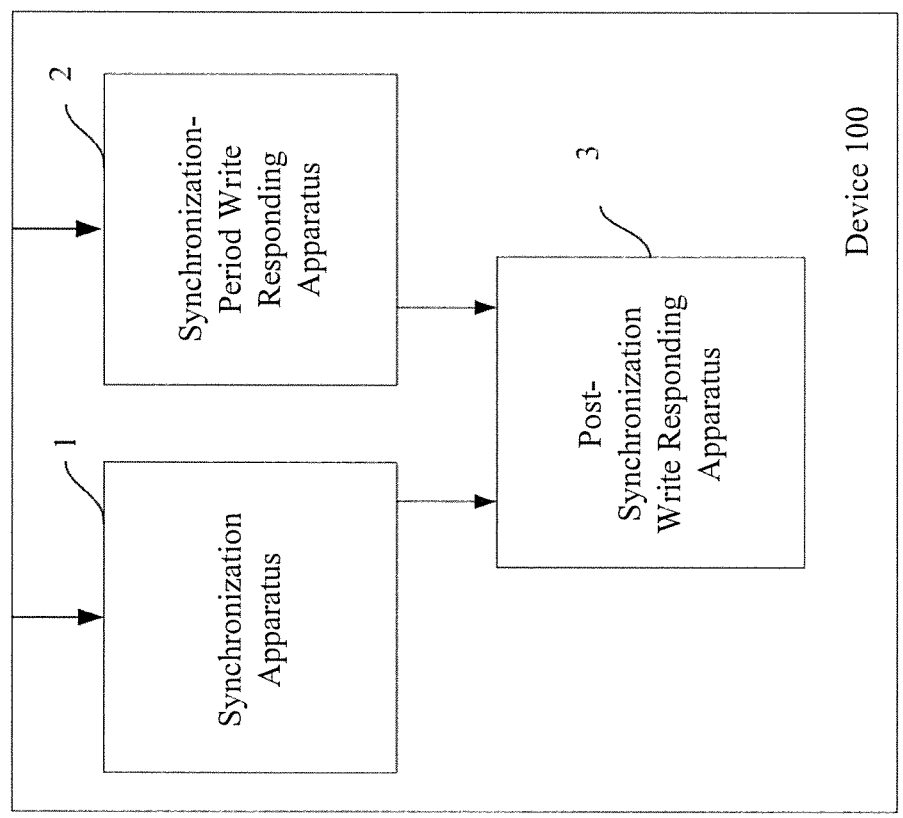
FIG. 7 is a structural diagram of an exemplary device for cluster switching, according to some embodiments of the present application.

FIG. 7 is a structural diagram of an exemplary device 100 for cluster switching, according to some embodiments of the present application. As shown in FIG. 7, device 100 for cluster switching may include the following apparatuses:

A synchronization apparatus 1 configured to synchronize original data to be synchronized on a first cluster to a second cluster after starting to switch from the first cluster to the second cluster. A priority of the original data on the second cluster is set to a lower priority.

Synchronization from a first cluster A to a second cluster B starts before switching from the first cluster A to the second cluster B. When the synchronization from the first cluster A to the second cluster B is completed, switching from the first cluster A to the second cluster B is also completed. Synchronization from the first cluster A to the second cluster B refers to backing up original data on the first cluster A to the primary cluster B. The second cluster B can externally provide data read/write services for a user after switching from the first cluster A to the second cluster B is completed.

In addition, because the synchronization from the first cluster A to the second cluster B starts before the cluster switching, the original data synchronized from the first cluster A on the second cluster B includes: original data synchronized from the first cluster A on the second cluster B before the cluster switching starts, and original data synchronized from the first cluster A on the second cluster B in the period from beginning to end of cluster switching. For example, there are originally 5000 pieces of original data on the first cluster A. The original data synchronized from the first cluster A on the second cluster B includes 2000 of the 5000 pieces of original data on the second cluster B that are already synchronized from the first cluster A before the cluster switching starts. Then, the original data synchronized from the first cluster A on the second cluster B further includes the 3000 pieces of original data that need to be synchronized from the first cluster A to the second cluster B in the period from beginning to end of cluster switching. No matter before the cluster switching starts or in a period from beginning to end of cluster switching, a priority of the original data synchronized from the first cluster A on the second cluster B may be set to a lower priority, e.g., a level of 0. The data can be distinguished from new data corresponding to a write operation request and with a priority subsequently set to be higher, e.g., a level of 1.

A synchronization-period write responding apparatus 2 configured to respond to a write operation request on the second cluster in the period of synchronizing the original data to be synchronized on the first cluster to the second cluster. A priority of new data corresponding to the write operation request is set to a higher priority, and a version of data with a higher priority is allowed to overwrite another version of data with a lower or the same priority on the second cluster.

Synchronization apparatus 1 and synchronization-period write responding apparatus 2 may work at the same time. After the cluster switching starts, two types of data exist on the second cluster B. One type is new data, and the other type is the original data synchronized from the first cluster A. To prevent the new data from being overwritten with the original data synchronized from the first cluster A, and to ensure that the new data, e.g., level-1 data, can overwrite the original data (e.g., lower priority data, such as level-0 data) synchronized from the first cluster A or updated new data (e.g., same-level data, such as level-1 data), it is set herein that a version of data with a higher priority is allowed to overwrite another version of data with a lower or the same priority on the second cluster B.

For example, there is original data a=100 on the second cluster B that is synchronized from the first cluster. Subsequently, a user initiates a write operation request and the request corresponds to new data a=200. Because the data a=100 has a lower priority, e.g., a level of 0, and the data a=200 has a higher priority, e.g., a level of 1, a version of data with the higher priority overwrites a version of data with the lower priority. A value of data a on the second cluster B is correspondingly updated to 200. If another user subsequently initiates an updated write operation request and the request corresponds to new data a=300, a version of data with the higher priority overwrites a previous version of data with a same priority. A value of data a on the second cluster is correspondingly updated to 300.

As another example, a user initiates a write operation request on the second cluster B and the request corresponds to new data a=200. Subsequently, there is original data a=100 synchronized from the first cluster A. Because the data a=100 has a lower priority, e.g., a level of 0, and the data a=200 has a higher priority, e.g., a level of 1, a version of data with the lower priority cannot overwrite a version of data with the higher priority. The value of the data a on the second cluster is still 200 correspondingly.

A post-synchronization write responding apparatus 3 configured to respond to the write operation request on the second cluster after synchronizing the original data to be synchronized on the first cluster to the second cluster.

Post-synchronization write responding apparatus 3 may work after synchronization apparatus 1 and synchronization-period write responding apparatus 2. After the cluster synchronization ends, because all original data on the first cluster A has been synchronized to the second cluster B, the data write operation request only needs to be responded to on the second cluster B. The priority of the data on the second cluster B no longer needs to be distinguished. In such case, switching can be performed on a primary cluster providing external services without affecting user usage. In other words, without the need to prohibit user's access, a user can read or write all data from beginning to end of switching, and consistency of data on both the first cluster and the second cluster can be ensured, thereby implementing seamless inter-cluster data migration or backup.

Figure 8:
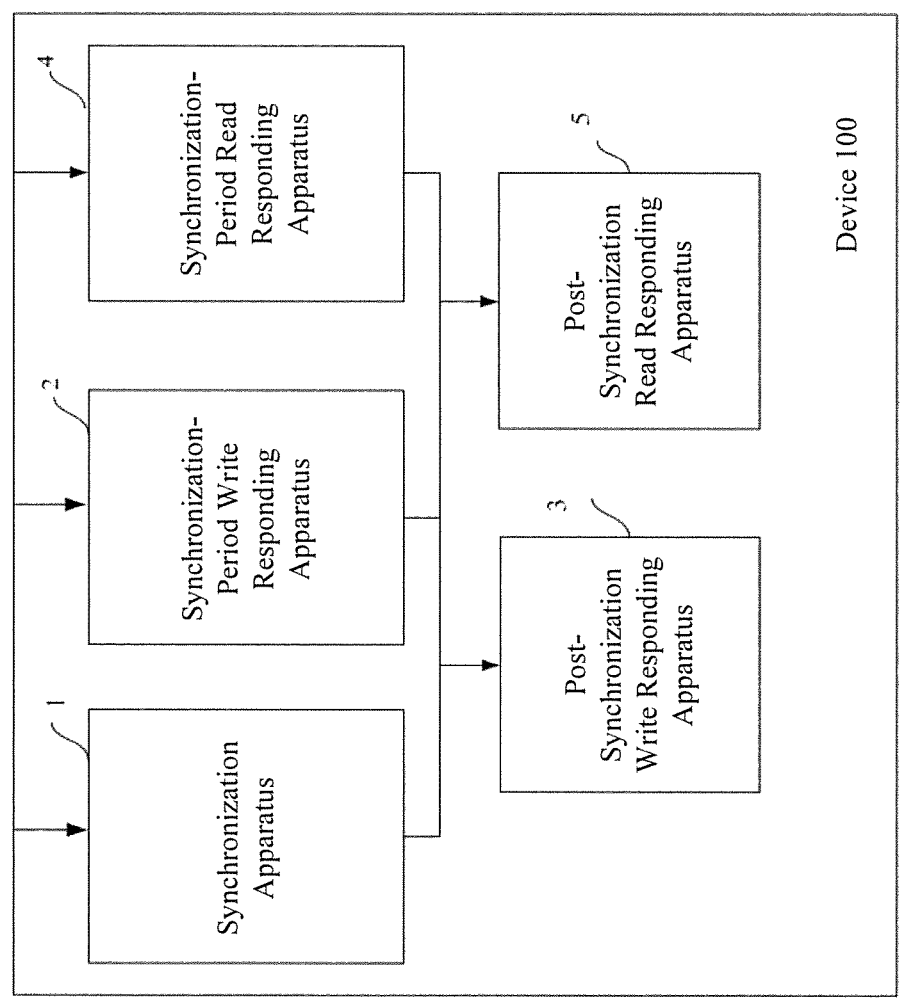
FIG. 8 is a structural diagram of an exemplary device for cluster switching, according to some embodiments of the present application.

FIG. 8 is a structural diagram of another exemplary device 100 for cluster switching, according to some embodiments of the present application. As shown in FIG. 8, device 100 may further include:

A synchronization-period read responding apparatus 4 configured to respond to a read operation request on the first cluster and the second cluster in the period of synchronizing the original data to be synchronized on the first cluster to the second cluster.

A post-synchronization read responding apparatus 5 configured to respond to the read operation request on the second cluster after synchronizing the original data to be synchronized on the first cluster to the second cluster.

Before the cluster synchronization ends, a data read operation request in the period of synchronization from the first cluster A to the second cluster B needs to be responded to on the first cluster and the second cluster. Before the cluster synchronization ends, and when some original data has not yet been synchronized to the second cluster, requested original data may still be found on the first cluster even though it is not found on the second cluster B. Therefore, the data read operation request in the period of synchronization from the first cluster A to the second cluster B may need to be responded to on both the first cluster and the second cluster. After the cluster synchronization ends, because all original data on the first cluster has been synchronized to the second cluster, the data read operation request may only need to be responded to on the second cluster. Thus, a data requirement of a user can be met both before and after the cluster switching ends.

In some embodiments, the write operation request may include an add, rewrite, or delete operation request for data. After switching from a first cluster to a second cluster starts, according to a write operation request of a user, new data the second cluster does not have is added thereto, an existing data version is modified, or existing data is deleted to meet various write operation requests from the user.

It is appreciated that the description of the foregoing write operation request is merely an example, and other existing description or description possibly appearing in the future of a write operation request, if applicable to the present application, should also fall within the protection scope of the present application.

Figure 9:
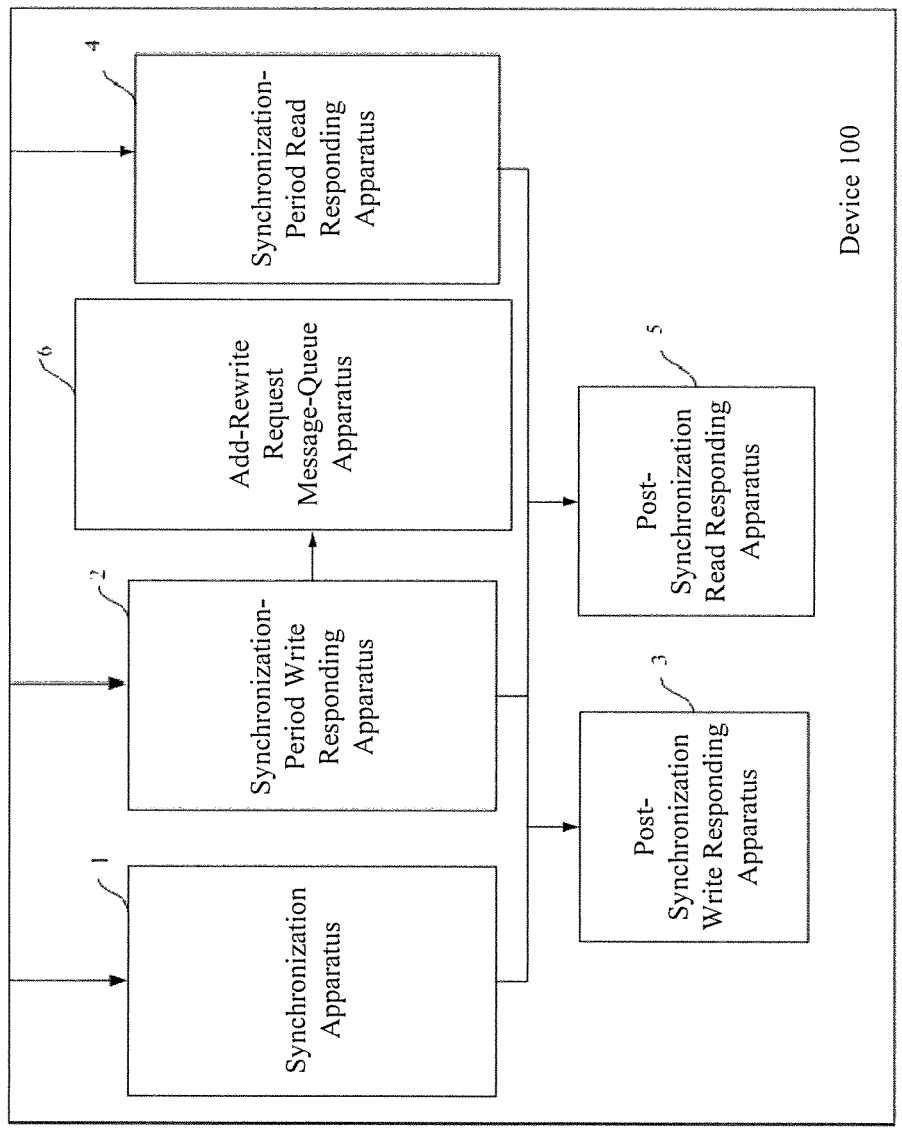
FIG. 9 is a structural diagram of an exemplary device for cluster switching, according to some embodiments of the present application.

FIG. 9 is a structural diagram of another exemplary device 100 for cluster switching, according to some embodiments of the present application. As shown in FIG. 9, device 100 may further include:

An add-rewrite request message-queue apparatus 6 configured to: when the write operation request is an add or rewrite operation request for data, and when responding to the write operation request on the second cluster in the period of synchronizing the original data to be synchronized on the first cluster to the second cluster, write the add or rewrite operation request into a message queue; read the add or rewrite operation request from the message queue; and delete the read write operation request from the message queue after synchronizing added or rewritten data, corresponding to the read add or rewrite operation request, on the second cluster to the first cluster.

The write operation request in the message queue is used to mark added or rewritten data on the second cluster B that is to be synchronized to the first cluster A. Each time a piece of data to be added or rewritten on the second cluster B is completely synchronized to the first cluster A, a corresponding write operation request can be deleted. In such way, consistency of data on both the first cluster and the second cluster is ensured. Synchronization of data on the two clusters can always be maintained to meet a new request for switching from the second cluster B back to the first cluster A.

It is appreciated that the description of the foregoing message queue is merely an example, and other existing description or description possibly appearing in the future of a message queue, if applicable to the present application, should also fall within the protection scope of the present application.

In some embodiments, add-rewrite request message-queue apparatus 6 may be configured to: determine whether added or rewritten data corresponding to the read add or rewrite operation request exist on the second cluster. If it exists, synchronize the added or rewritten data to the first cluster, and delete the read add or rewrite operation request from the message queue. When data synchronization fails once, data synchronization may repeatedly be tried until the data to be added or rewritten on the second cluster is successfully synchronized to the first cluster A. If it does not exist, delete the read add or rewrite operation request from the message queue.

When writing data to be added or rewritten into the second cluster B fails, although a corresponding add or rewrite operation request is recorded in the message queue, data not existing on the second cluster B may not need to be synchronized to the first cluster A. Instead, the read add or rewrite operation request may be directly deleted from the message queue. In this way, consistency of data on both the first cluster and the second cluster can be ensured.

It is appreciated that the description of whether a read add/rewrite operation request exists on a second cluster are merely examples, and other existing description or description possibly appearing in the future of whether a read add/rewrite operation request exists on a second cluster, if applicable to the present application, should also fall within the protection scope of the present application.

Figure 10:
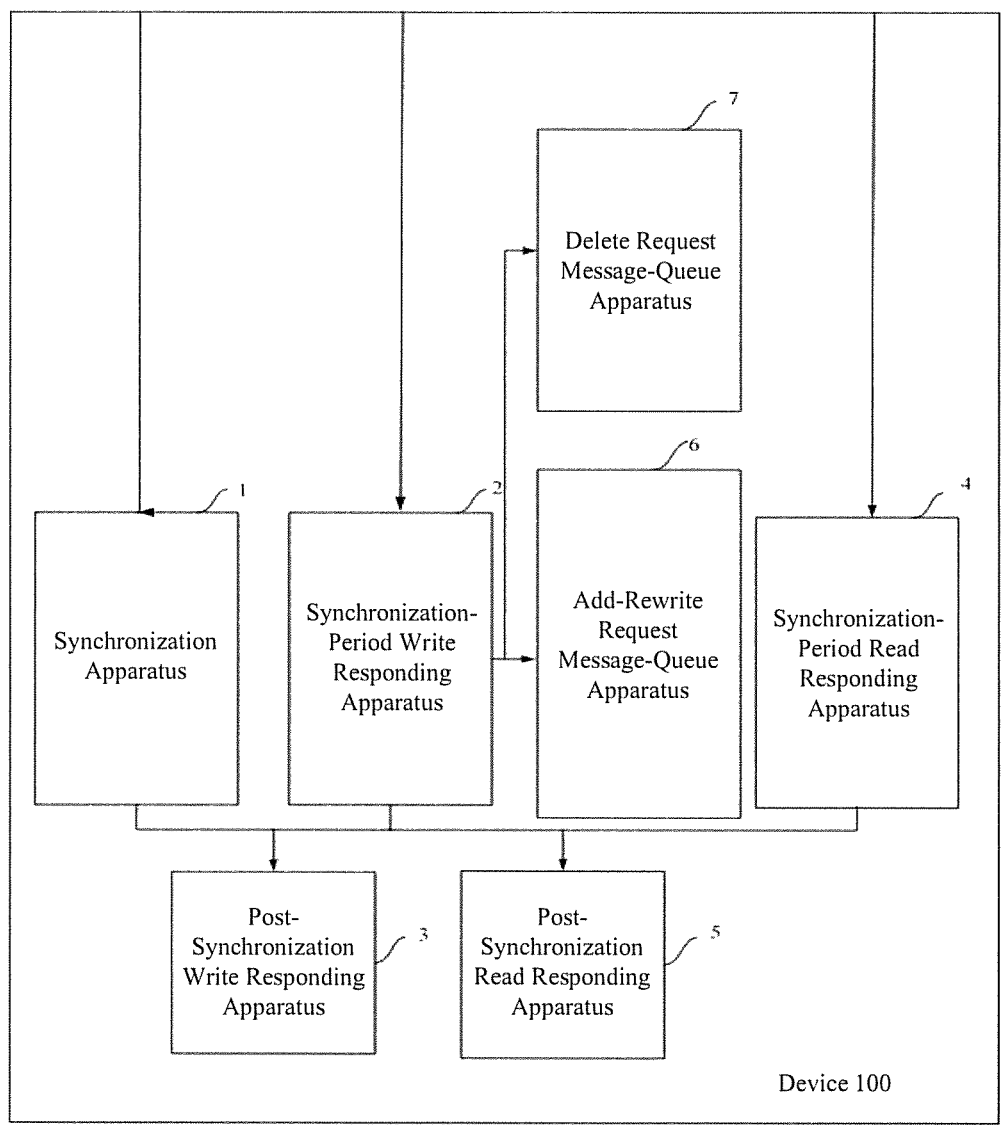
FIG. 10 is a structural diagram of an exemplary device for cluster switching, according to some embodiments of the present application.

FIG. 10 is a structural diagram of an exemplary device 100 for cluster switching, according to some embodiments of the present application. As shown in FIG. 10, device 100 may further include:

A delete request message-queue apparatus 7 configured to: when the write operation request is a delete operation request for data, and when responding to the write operation request on the second cluster in the period of synchronizing the original data to be synchronized on the first cluster to the second cluster, write the delete operation request into a message queue; read the delete operation request from the message queue; and delete the read delete operation request from the message queue after rendering corresponding data on the first cluster and the second cluster consistent with each other in accordance with the read delete operation request.

A write operation request in the message queue is used to mark data to be deleted on the second cluster B that is to be rendered consistent with the corresponding data on the first cluster A. Each time a piece of data to be deleted on the second cluster B is rendered consistent with the data on the first cluster A, a corresponding write operation request is deleted. In this way, consistency of data on both the first cluster and the second cluster is ensured. Synchronization of data on the two clusters can always be maintained to meet a new request for switching from the second cluster B back to the first cluster A.

It is appreciated that the description of the foregoing message queue is merely an example, and other existing description or description possibly appearing in the future of a message queue, if applicable to the present application, should also fall within the protection scope of the present application.

In some embodiments, delete request message-queue apparatus 7 may be configured to perform the following operations:

If data to be deleted corresponding to the read delete operation request does not exist on either the first cluster or the second cluster, delete the read delete operation request from the message queue. In such a case, the corresponding data on the first cluster and the second cluster has been rendered consistent with each other. The read delete operation request can be directly deleted from the message queue.

If data to be deleted corresponding to the read delete operation request does not exist on the second cluster but exists on the first cluster, delete the read delete operation request from the message queue after deleting the corresponding data to be deleted on the first cluster. Because the corresponding data on the second cluster is already deleted, the corresponding data to be deleted on the first cluster should be deleted. Then the read delete operation request is deleted from the message queue. The corresponding data on the first cluster and the second cluster can be rendered consistent with each other.

If data to be deleted corresponding to the read delete operation request does not exist on the first cluster but exists on the second cluster, delete the read delete operation request from the message queue after synchronizing the corresponding data to be deleted on the second cluster to the first cluster. Because data on the second cluster B that should be deleted is not deleted, to render data on the first cluster A always consistent with that on the second cluster B, the corresponding delete operation request may be deleted from the message queue after the data that should be deleted but is not yet deleted on the second cluster B is synchronized to the first cluster A.

If data to be deleted corresponding to the read delete operation request exists on both the first cluster and the second cluster, delete the read delete operation request from the message queue. Because the corresponding data on the first cluster and the second cluster is already rendered consistent with each other, the read delete operation request can be directly deleted from the message queue.

It is appreciated that the foregoing description that the corresponding data on the first cluster and the second cluster is rendered consistent with each other are merely examples. Other existing description or possibly appearing description in the future that corresponding data on a first cluster and a second cluster is rendered consistent with each other, if applicable to the present application, should also fall within the protection scope of the present application.

In some embodiments, synchronization-period read responding apparatus 4 may be configured to determine whether data corresponding to the read operation request is read from the first cluster and the second cluster. Synchronization-period read responding apparatus 4 may be configured to return the data if the corresponding data is read from the first cluster or the second cluster. For example, if the corresponding data is read from one of the first cluster and the second cluster, the read data can be directly returned to meet a read request from a user.

Alternatively, synchronization-period read responding apparatus 4 may be configured to return the corresponding data read from the second cluster if the corresponding data is read from both the first cluster and the second cluster. For example, if the corresponding data is read from both the first cluster and the second cluster, data on the second cluster B either has a version consistent with that of data on the first cluster A, or has a version newer than that of data on the first cluster A. In other words, an updated version of corresponding data with a higher priority after replacement, the corresponding data read from the second cluster can be returned to the user.

In the present application, in the period of synchronization from the first cluster to the second cluster, a write operation request is responded to on the second cluster. A priority of new data corresponding to the write operation request is set to a higher priority. A version of data with a higher priority is allowed to overwrite another version of data with a lower or the same priority on the second cluster. In this way, switching can be performed on a primary cluster providing external services without affecting user usage. In other words, without the need to prohibit user access, a user can read or write all data from beginning to end of switching, and consistency of data on both the first cluster and the second cluster can be ensured, thereby implementing seamless inter-cluster data migration or backup.

In addition, in the present application, the add or rewrite operation request is written into a message queue, the add or rewrite operation request is read from the message queue, and the read write operation request is deleted from the message queue after data to be added or rewritten corresponding to the read add or rewrite operation request on the second cluster B is synchronized to the first cluster A. In this way, consistency of data on both the first cluster and the second cluster is ensured. Synchronization of data on the two clusters can always be maintained to meet a newly appearing requirement of switching from the second cluster B back to the first cluster A.

Furthermore, in the present application, the delete operation request is written into a message queue, the delete operation request is read from the message queue, and the read delete operation request is deleted from the message queue after corresponding data on the first cluster and the second cluster is rendered consistent with each other according to the read delete operation request. In this way, consistency of data on both the first cluster and the second cluster is ensured. Synchronization of data on the two clusters can always be maintained to meet a newly appearing requirement of switching from the second cluster B back to the first cluster A.

Those skilled in the art can make various modifications and variations to the present application without departing from the spirit and scope of the present application. The present application is intended to cover these modifications and variations provided that they fall within the protection scope defined by the claims of the present application and their equivalent technologies.

It should be noted that the present methods and apparatuses may be implemented in software and/or a combination of software and hardware. For example, they may be implemented by using a dedicated integrated circuit (ASIC), a general-purpose computer or any another similar hardware device. In some embodiments, a software program of the present application may implement the step or function described above by means of execution of a processor. Similarly, the software program (including a related data structure) of the present application may be stored in a non-transitory computer-readable recording medium, for example, a RAM memory, a magnetic or optical driver, a floppy disk or a similar device. In addition, some steps or functions of the present application may be implemented by means of hardware, for example, a circuit for performing the steps or functions in coordination with the processor.

In addition, a part of the present application may be applied as a computer program product, for example, a computer program instruction. When the computer program instruction is executed by a computer, the computer may be operated to invoke or provide the method and/or technical solutions according to the present application. The program instruction for invoking the method of the present application may be stored in a fixed or movable recording medium, and/or transmitted by using a data flow in a broadcast or another signal carrying media, and/or stored in a working memory of a computer device running according to the program instruction. Herein, some embodiments according to the present application include an apparatus. The apparatus includes a memory configured to store the computer program instruction and a processor configured to execute the program instruction. When the computer program instruction is executed by the processor, the apparatus is triggered to run the foregoing method and/or technical solutions based on multiple embodiments according to the present application.

For those skilled in the art, the present application is not limited to the details of the foregoing exemplary embodiments. In addition, the present application can be implemented in another specific form without departing from the spirit or basic features of the present application. Therefore, from whichever point of view, the embodiment should be considered exemplary and non-restrictive. The scope of the present application is limited by the appended claims rather than the foregoing description. Therefore, this is intended to include all changes falling within the meaning and scope of equivalent important elements of the claims in the present application. No reference sign in the claims should be considered as a limitation on the related claims. In addition, certainly, the word "include" does not exclude another unit or step, and a singular form does not exclude a plural form. Multiple units or apparatuses described in the apparatus claims may also be implemented by one unit or apparatus by means of software or hardware. Words such as first or second are used to represent a name, and not to represent any particular order.

What is claimed is:

1. A method for cluster switching, comprising:
Synchronizing original data to be synchronized on a first cluster to a second cluster after starting to switch from the first cluster to the second cluster, wherein the original data on the second cluster is set to have a lower priority;
responding to a write operation request on the second cluster in the period of synchronizing the original data on the first cluster to the second cluster, wherein data corresponding to the write operation request is set to have a higher priority, and wherein a version of data with a higher priority is allowed to overwrite another version of data with a lower priority on the second cluster; and
responding to the write operation request on the second cluster after synchronizing the original data on the first cluster to the second cluster.

2. The method of claim 1, wherein:
in the period of synchronizing the original data on the first cluster to the second cluster, the method further comprises:
responding to a read operation request on the first cluster and the second cluster, and
after synchronizing the original data on the first cluster to the second cluster, the method further comprises:
responding to the read operation request on the second cluster.

3. The method of claim 2, wherein responding to the read operation request on the first cluster and the second cluster in the period of synchronizing the original data on the first cluster to the second cluster includes:
determining whether data corresponding to the read operation request is read from the first cluster and the second cluster,
returning the data in response to the corresponding data that is read from the first cluster or the second cluster; and
returning the corresponding data read from the second cluster in response to the corresponding data that is read from both the first cluster and the second cluster.

4. The method of claim 1, wherein the write operation request includes an add, rewrite, or delete operation request for data.

5. The method of claim 4, wherein when the write operation request is an add or rewrite operation request for data, and when responding to the write operation request on the second cluster in the period of synchronizing the original data on the first cluster to the second cluster, the method further comprises:
writing the add or rewrite operation request into a message queue;
reading the add or rewrite operation request from the message queue; and
deleting the read write operation request from the message queue after synchronizing added or rewritten data, corresponding to the read add or rewrite operation request, on the second cluster to the first cluster.

6. The method of claim 5, wherein deleting the read write operation request from the message queue after synchronizing added or rewritten data, corresponding to the read add or rewrite operation request, on the second cluster to the first cluster includes:
determining whether added or rewritten data corresponding to the read add or rewrite operation request exist on the second cluster;
responsive to a determination that the added or rewritten data exists on the second cluster, synchronizing the added or rewritten data to the first cluster, and deleting the read add or rewrite operation request from the message queue; and
responsive to a determination that the added or rewritten data does not exist on the second cluster, deleting the read add or rewrite operation request from the message queue.

7. The method of claim 4, wherein when the write operation request is a delete operation request for data, and when responding to the write operation request on the second cluster in the period of synchronizing the original data on the first cluster to the second cluster, the method further comprises:
writing the delete operation request into a message queue;
reading the delete operation request from the message queue; and
deleting the read delete operation request from the message queue after rendering corresponding data on the first cluster and the second cluster consistent with each other in accordance with the read delete operation request.

8. The method of claim 7, wherein deleting the read delete operation request from the message queue after rendering corresponding data on the first cluster and the second cluster consistent with each other in accordance with the read delete operation request includes:
in response to data to be deleted corresponding to the read delete operation request that does not exist on either the first cluster or the second cluster, deleting the read delete operation request from the message queue;
in response to data to be deleted corresponding to the read delete operation request that does not exist on the second cluster but exists on the first cluster, deleting the read delete operation request from the message queue after deleting the corresponding data to be deleted on the first cluster;
in response to data to be deleted corresponding to the read delete operation request that does not exist on the first cluster but exists on the second cluster, deleting the read delete operation request from the message queue after synchronizing the corresponding data to be deleted on the second cluster to the first cluster; or in response to data to be deleted corresponding to the read delete operation request that exists on both the first cluster and the second cluster, deleting the read delete operation request from the message queue.

9. A device for cluster switching, comprising:
a synchronization apparatus configured to synchronize original data to be synchronized on a first cluster to a second cluster after starting to switch from the first cluster to the second cluster, wherein a priority of the original data on the second cluster is set to a lower priority;
a synchronization-period write responding apparatus configured to respond to a write operation request on the second cluster in the period of synchronizing the original data on the first cluster to the second cluster, wherein data corresponding to the write operation request is set to have a higher priority, and wherein a version of data with a higher priority is allowed to overwrite another version of data with a lower priority on the second cluster; and
a post-synchronization write responding apparatus configured to respond to the write operation request on the second cluster after synchronizing the original data on the first cluster to the second cluster.

10. The device of claim 9, further comprising:
a synchronization-period read responding apparatus configured to respond to a read operation request on the first cluster and the second cluster in the period of synchronizing the original data on the first cluster to the second cluster; and
a post-synchronization read responding apparatus configured to respond to the read operation request on the second cluster after synchronizing the original data on the first cluster to the second cluster.

11. The device of claim 10, wherein the synchronization-period read responding apparatus is configured to:
determine whether data corresponding to the read operation request is read from the first cluster and the second cluster,
return the data in response to the corresponding data that is read from the first cluster or the second cluster; and
return the corresponding data read from the second cluster in response to the corresponding data that is read from both the first cluster and the second cluster.

12. The device of claim 9, wherein the write operation request includes an add, rewrite, or delete operation request for data.

13. A non-transitory computer readable medium that stores a set of instructions that is executable by at least one processor of an apparatus to cause the apparatus to perform a method for cluster switching, the method comprising:
synchronizing original data to be synchronized on a first cluster to a second cluster after starting to switch from the first cluster to the second cluster, wherein the original data on the second cluster is set to have a lower priority;
responding to a write operation request on the second cluster in the period of synchronizing the original data on the first cluster to the second cluster, wherein data corresponding to the write operation request is set to have a higher priority, and wherein a version of data with a higher priority is allowed to overwrite another version of same data with a lower priority on the second cluster; and
responding to the write operation request on the second cluster after synchronizing the original data on the first cluster to the second cluster.

14. The non-transitory computer-readable medium of claim 13, wherein a version of data is allowed to overwrite another version of data with the same priority on the second cluster.

15. The non-transitory computer-readable medium of claim 13, wherein:
in the period of synchronizing the original data on the first cluster to the second cluster, wherein the set of instructions that is executable by that at least one processor of the apparatus causes the apparatus to further perform:
responding to a read operation request on the first cluster and the second cluster, and
after synchronizing the original data on the first cluster to the second cluster, wherein the set of instructions that is executable by that at least one processor of the apparatus causes the apparatus to further perform:
responding to the read operation request on the second cluster.

16. The non-transitory computer-readable medium of claim 13, wherein the write operation request includes an add, rewrite, or delete operation request for data.

17. The non-transitory computer-readable medium of claim 16, wherein when the write operation request is an add or rewrite operation request for data, and when responding to the write operation request on the second cluster in the period of synchronizing the original data on the first cluster to the second cluster, wherein the set of instructions that is executable by that at least one processor of the apparatus causes the apparatus to further perform:
writing the add or rewrite operation request into a message queue;
reading the add or rewrite operation request from the message queue; and
deleting the read write operation request from the message queue after synchronizing added or rewritten data, corresponding to the read add or rewrite operation request, on the second cluster to the first cluster.

18. The non-transitory computer-readable medium of claim 17, wherein deleting the read write operation request from the message queue after synchronizing added or rewritten data, corresponding to the read add or rewrite operation request, on the second cluster to the first cluster includes:
determining whether added or rewritten data corresponding to the read add or rewrite operation request exist on the second cluster;
responsive to a determination that the added or rewritten data exists on the second cluster, synchronizing the added or rewritten data to the first cluster, and deleting the read add or rewrite operation request from the message queue; and
responsive to a determination that the added or rewritten data does not exist on the second cluster, deleting the read add or rewrite operation request from the message queue.

19. The non-transitory computer-readable medium of claim 16, wherein when the write operation request is a delete operation request for data, and when responding to the write operation request on the second cluster in the period of synchronizing the original data on the first cluster to the second cluster, wherein the set of instructions that is executable by that at least one processor of the apparatus causes the apparatus to further perform:
writing the delete operation request into a message queue;
reading the delete operation request from the message queue; and
deleting the read delete operation request from the message queue after rendering corresponding data on the first cluster and the second cluster consistent with each other in accordance with the read delete operation request.

20. The non-transitory computer-readable medium of claim 19, wherein deleting the read delete operation request from the message queue after rendering corresponding data on the first cluster and the second cluster consistent with each other in accordance with the read delete operation request includes:
   in response to data to be deleted corresponding to the read delete operation request that does not exist on either the first cluster or the second cluster, deleting the read delete operation request from the message queue;
   in response to data to be deleted corresponding to the read delete operation request that does not exist on the second cluster but exists on the first cluster, deleting the read delete operation request from the message queue after deleting the corresponding data to be deleted on the first cluster;
   in response to data to be deleted corresponding to the read delete operation request that does not exist on the first cluster but exists on the second cluster, deleting the read delete operation request from the message queue after synchronizing the corresponding data to be deleted on the second cluster to the first cluster; or
   in response to data to be deleted corresponding to the read delete operation request that exists on both the first cluster and the second cluster, deleting the read delete operation request from the message queue.

21. The non-transitory computer-readable medium of claim 15, wherein responding to the read operation request on the first cluster and the second cluster in the period of synchronizing the original data on the first cluster to the second cluster includes:
   determining whether data corresponding to the read operation request is read from the first cluster and the second cluster,
   returning the data in response to the corresponding data that is read from the first cluster or the second cluster; and
   returning the corresponding data read from the second cluster in response to the corresponding data that is read from both the first cluster and the second cluster.

* * * * *